United States Patent [19]

Araki et al.

[11] Patent Number: 4,899,138
[45] Date of Patent: Feb. 6, 1990

[54] TOUCH PANEL CONTROL DEVICE WITH TOUCH TIME AND FINGER DIRECTION DISCRIMINATION

[75] Inventors: Morio Araki; Shigeto Mori; Michihiro Kaneko; Yasunao Go, all of Saitama, Japan

[73] Assignee: Pioneer Electronic Corporation, Tokyo, Japan

[21] Appl. No.: 161,929

[22] Filed: Feb. 29, 1988

[51] Int. Cl.⁴ .............................................. G09G 3/02
[52] U.S. Cl. ..................................... 340/712; 340/707
[58] Field of Search ............... 340/706, 711, 712, 707; 341/20; 178/18, 19

[56] References Cited

U.S. PATENT DOCUMENTS

| | | | |
|---|---|---|---|
| 4,122,438 | 10/1978 | Bird | 340/707 |
| 4,221,975 | 9/1980 | Ledniczki et al. | 341/20 |
| 4,277,783 | 7/1981 | Sampieri et al. | 340/707 |
| 4,313,109 | 1/1982 | Funk et al. | 178/18 |
| 4,413,314 | 11/1983 | Slater et al. | 340/706 |
| 4,492,958 | 1/1985 | Minami | 340/712 |
| 4,495,651 | 1/1985 | Froeliger | 340/712 |
| 4,521,870 | 6/1985 | Babbel et al. | 340/712 |
| 4,631,525 | 12/1986 | Serravalle Jr. | 340/712 |
| 4,684,801 | 8/1987 | Carroll et al. | 340/712 |
| 4,710,759 | 12/1987 | Fitzgibbon | 340/712 |
| 4,761,637 | 8/1988 | Lucas et al. | 340/712 |
| 4,766,424 | 8/1988 | Adler et al. | 340/712 |
| 4,774,404 | 9/1988 | Hasegawa et al. | 340/712 |

FOREIGN PATENT DOCUMENTS 0150904 8/1985 European Pat. Off. .
8505477 12/1985 Int'l Pat. Institute .

OTHER PUBLICATIONS

IBM Technical Disclosure Bulletin, vol. 20, No. 4, 9/7/77 pp. 1609-1611.

Primary Examiner—David K. Moore
Assistant Examiner—Richard Hjerpe
Attorney, Agent, or Firm—Sughrue, Mion, Zinn, Macpeak & Seas

[57] ABSTRACT

In a touch panel control device for providing control signals to select an operation mode for an electronic device according to how the finger touches a touch panel, a timer starts its operation from the time instant when the finger touches the touch panel, and the direction and distance of movement of the finger in a predetermined period of time are detected, to control the operation of the electronic device or the like.

3 Claims, 6 Drawing Sheets

TOUCH PANEL CONTROL DEVICE WITH TOUCH TIME AND FINGER DIRECTION DISCRIMINATION

BACKGROUND OF THE INVENTION

The invention relates to a touch panel control device for acoustic equipment.

Acoustic entertainment devices for vehicles, such as a cassette tape player, compact disk player and radio tuner are installed in a considerably small space such as an in-dash console, and therefore must be small in size. Accordingly, the switches or push-buttons of the acoustic devices must also be small. These small switches or push-buttons are difficult to operate. Furthermore, the acoustic devices are used in different modes and operated in various manners. Therefore they employ a variety of switches, push-buttons, etc. Since the operator cannot easily locate them while driving, his attention to the road may be distracted when operating the acoustic devices causing a dangerous condition.

In this connection, a method has been disclosed in Japanese Patent Application (OPI) No. 89720/1986 (the term "OPI" as used herein means an "unexamined published application") in which instead of switches or push-buttons for operating acoustic devices, there is provided a touch panel, the different controls of the devices being effected by touching different positions on the touch panel.

Figure 1:
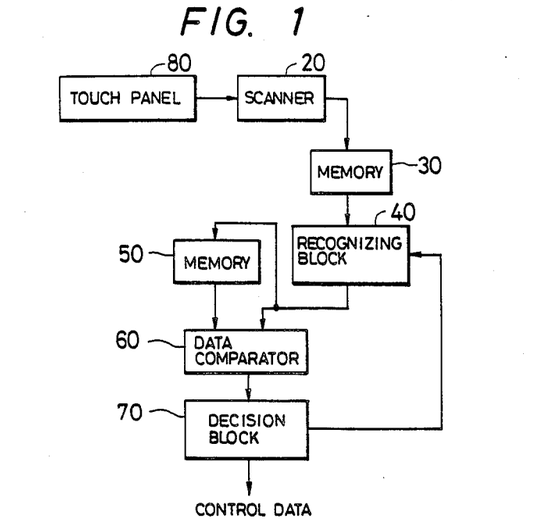
FIG. 1 is a block diagram showing a conventional touch panel control device.

The conventional touch panel method will be described with reference to FIG. 1. A touch panel 80 having interior detecting electrodes is scanned with a scanner 20 to detect when and at what point the touch panel 80 has been touched. The detection output data of the scanner 20 are applied to a first memory 30, where the detection output data of a scan are temporarily stored. The detection output data of one scan read out of the the first memory 30 are supplied to a recognizing block 40. A touch on the touch panel is pattern-recognized by the recognizing block 40 for each scan of the scanner 20.

The output pattern data of the recognizing block 40 are applied to a second memory 50 and a data comparator 60. The second memory 50 temporarily stores the recognized pattern data produced during one scan and supplied thereto from the recognizing block 40. The data comparator 60 compares the output pattern data of the recognizing block with the pattern data of the preceding scan read out of the second memory 50, to thereby detect any change in the pattern data. The comparison output data of the data comparator 60 is supplied to a decision block 70 which outputs control data corresponding to the comparison output data. In response to the comparison output data, the decision block 70 refers to a data table (not shown) and outputs predetermined control data according to the touch on the touch panel 80.

As is apparent from the above description, in the conventional touch panel control device, the touch data of the present scan is merely compared with that of the preceding scan. Therefore, if the scanning speed is increased, the control device may judge no change in the touch position between two successive scans because the distance the finger can move over a scanning period is related to the scanning speed. If, on the other hand, the scanning speed is decreased, the following error may be encountered. If a finger finely touches and is removed from the panel and the part of the panel touched has not yet been scanned (for instance the right part of the panel in the case of scanning the panel in the left-to-right direction), then that touch on the panel may not be detected.

Preferably, the entire panel surface should be scanned in about 10 msec to prevent a detection miss. However, if the scanning speed is set to about 10 msec, there may be an erroneous detection because, as mentioned herein before, finger speed cannot follow a rapid scanning speed.

SUMMARY OF THE INVENTION

Accordingly, an object of this invention is to eliminate the above-described difficulties with a conventional touch panel control device.

The foregoing object and other objects of the invention have been achieved by the touch panel control device of the invention for outputting control data to select an operating mode for an electronic device according to how the finger touches a touch panel. The touch panel control device of the invention comprises: touch position detecting means, arranged in matrix form on the touch panel, for detecting the coordinates of a touch position on the touch panel; scanning means for periodically scanning the touch position detecting means; memory means for storing the coordinates of an initial touch position on the touch panel or those of a touch position obtained when the control data is outputted; coordinate comparing means for comparing the coordinates stored in the memory means with those of a current touch position determined for each scan while the finger touches the panel; timer means for performing a time measuring operation with the aid of the output of the touch position detecting means; and an operation discriminator for outputting operation content data predetermined according to time measurement data of the timer means and the results of the comparison of the coordinate comparing means.

The nature, principle and utility of the invention will become more apparent from the following detailed description when read in conjunction with the accompanying drawings.

Figure 2:
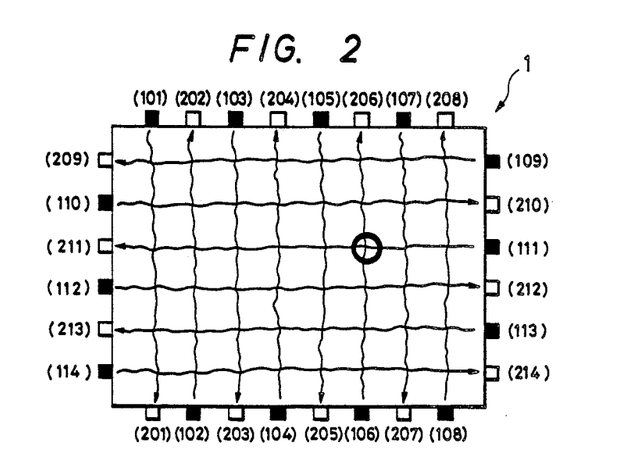
FIG. 2 is a front view showing a touch panel in a touch panel control device according to the invention.

DETAILED DESCRIPTION OF THE PREFERRED EMBODIMENT:

An example of a touch panel control device according to this invention will be described with reference to FIG. 2. In FIG. 2. reference numeral 1 designates a touch panel. Along the four sides of the touch panel are LEDs (light emitting diodes) 101 through 114 and light receiving means, namely, photo-transistors 201 through 214. They are alternately arranged in such a manner that the photo-transistors 201 through 214 receive light beams from the LEDs 101 through 114, respectively. The photo-transistors 201 through 214 provide "H" (high level) outputs upon reception of the light beams. The LEDs and the photo-transistors are alternately arranged along the sides of the touch panel to eliminate the possibility that a photo-transistors might erroneously detect the light beam emitted by an adjacent LED rather than its corresponding LED.

Figure 3:
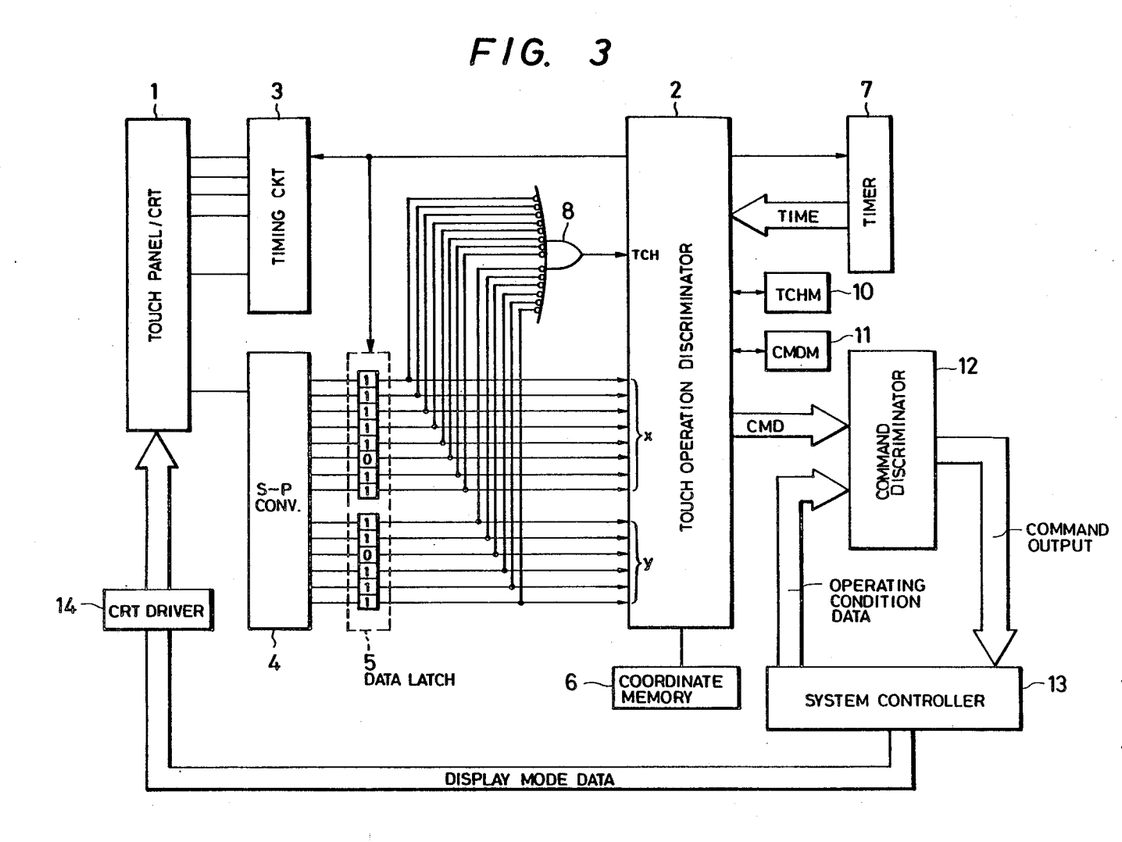
FIG. 3 is a block diagram showing the touch panel control device according to the invention.

A control system for the touch panel 1 is shown in FIG. 3. The control system includes a touch operation discriminator 2. The discriminator 2 detects when the operator's finger touches the touch panel 1, and discriminates the operation to be performed from the direction of finger movement and the time period over which the finger touches the touch panel. The discriminated operation is applied to a command discriminator 12. The command discriminator 12 supplies an operation command to a system controller 13 in response to the discriminated command. The operation command controls the operation of an electronic device such as a cassette player, radio tuner or compact disk player, and feeds back the operating condition thereof, as data, to the command discriminator 12.

Figure 4:
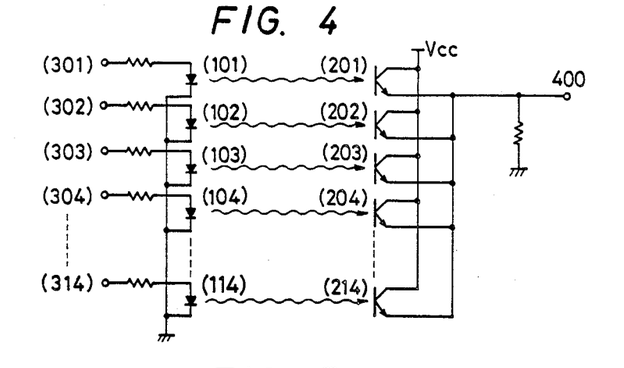
FIG. 4 is a circuit diagram of one example of a touch position detecting means in the touch panel control device of the invention.
Figure 5:
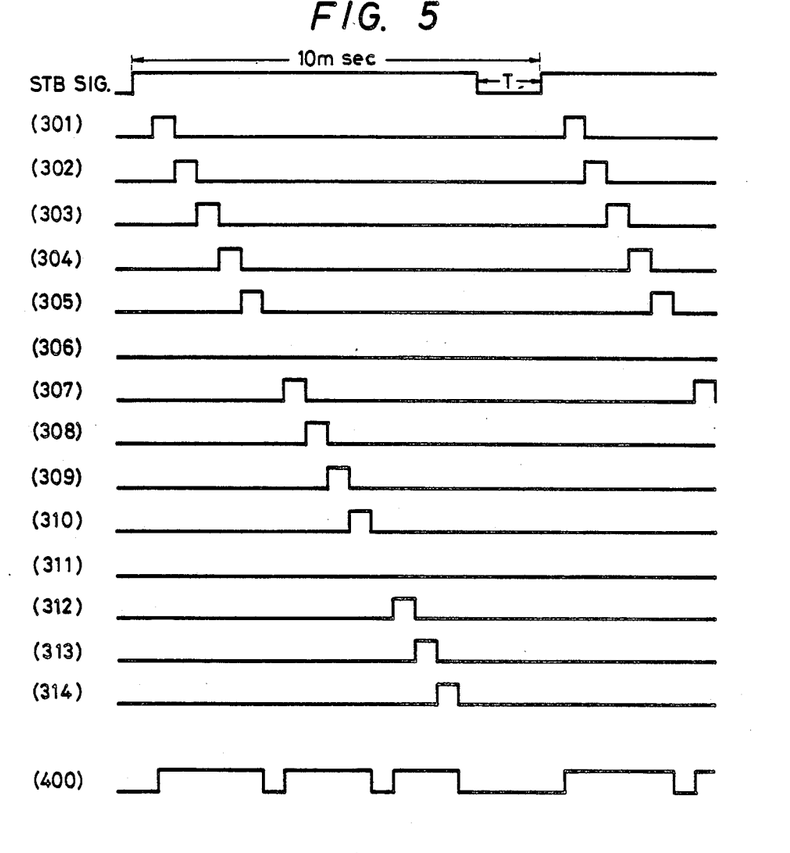
FIG. 5 is a timing chart for a description of the operation of the touch position detecting means shown in FIG. 4.

The operation discriminator 2 also applies a scanning pulse signal (STB signal) to a timing circuit 3 with a period of about 10 msec as shown in a timing chart of FIG. 5. The scanning time is not necessarily 10 msec. It should be determined on the basis of the speed of the finger scanning the panel. During the generation of the STB signal, the timing circuit 3 produces pulses for activating the LEDs 101 through 114 in FIG. 2 so that turn on input voltages are successively applied to the input terminals 301 through 314 of the LEDs 101 through 114. The light from the LEDs 101 through 114 are applied to the photo-transistors 201 through 214, respectively, the outputs of which are provided at an output terminal 400 in FIG. 4. The timing of the serial outputs is as indicated in FIG. 5. The serial outputs are applied to a serial-to-parallel converter 4, where they are converted into parallel outputs which are latched by a data latch 5. One scanning operation is completed when the timing circuit 3 has applied the input voltages to all the LEDs. During a waiting time T, the data latched by the data latch 5 are successively transferred to the operation discriminator 2.

The timing chart of FIG. 5 represents the case where the finger touches the touch panel at a point marked with a circle in FIG. 2. In this case, the outputs of the LEDs 106 and 111 being blocked, and therefore the outputs of photo-transistors 206 and 211 are maintained at the "L" (low level). Therefore, the data latched by the data latch circuit 5 are:

1 1 1 1 1 0 1 1: in the X-direction
1 1 0 1 1 1: in the Y-direction

As apparent from the above, the coordinates of the touch position can be detected from the positions of the "0" levels in the data latch.

During the waiting time T, the output of the data latch circuit 5 are simultaneously applied to a NOR gate 8, the output of which is raised to "H" when the finger touches the panel.

With further reference to FIG. 3, reference numeral 6 designates a coordinate memory for storing the coordinates of a touch position at the start of a touch or at the end of an operation; and 7, a timer which is reset in synchronism with the storing operation of the coordinate memory 6, to start its time counting operation. The control system further comprises an arithmetic circuit (not shown) for comparing the coordinates of the present touch position with those stored in the coordinate memory 6, to detect the direction of movement of the finger on the panel 1; a touch memory 10 for storing the touch and non-touch on the touch panel 1; and a command memory 11 for storing the operation content which is discriminated by the operation discriminator 2 and applied to the command discriminator 12.

The operation discriminator 2 supplies a CMD signal representing the content of an operation given to the touch panel 1 to the command discriminator 12. In response to the CMD signal the command discriminator 12 applies a command to the system controller 13 for operating the acoustic device.

In general, the following commands are required for acoustic devices used in vehicles:

(1) Tape Deck

Fast forward, rewind, stop, repetitive playback, jump for station, and playback (2) Tuner Up sweep, down sweep, preset channel up, preset channel down, channel preset, and auto tuning (3) Compact Disk Playback partial repeat, whole repeat, skip, stop, jump for music, and disk take-out As is apparent from the above, six or seven different commands are required for each acoustic device used in vehicles.

These commands can be issued by utilization of, for instance, seven finger operations on the touch panel; movements of the finger upwardly, downwardly, right and left (U, D, R and L), keeping the finger at a point (KEEP), touching the panel with the finger twice (2HIT). The above-described seven finger operations are discriminated so that the command discriminator 12 applies commands to the concerned acoustic device separately according to the finger operations.

The above-described seven finger operations can be discriminated not only by the contents of the aforementioned arithmetic circuit, but also based on the content of the touch memory circuit 10 in which the touch condition of the preceding scan is stored, the content of the command memory 11 which stores the command which has been applied to the command discriminator 12 before the scan, and the time count in the timer 7.

For instance, the commands can be issued as follows:
(1) When the coordinate changes are at least four a second, the commands U,D, R and L are outputted separately according to the directions of movement thereof.
(2) The command KEEP is outputted when the finger is kept on the touch panel for at least one second and moves three coordinates or less.
(3) The command HIT is outputted when the finger is kept on the panel for 0.5 second or less, and moves three coordinates or less.
(4) The command 2HIT is outputted when, within two seconds after the issue of the command HIT, the finger is operated in the same manner as in the case of outputting the command HIT.

A method of discriminating the above-described finger operations will be described with reference to the flow charts of FIGS. 6, 7, and 8.

In these figures steps 1 through 7 form a routine for staring, when the finger touches the panel, storage of the coordinates of that position and the operation of the timer. When the operation discriminator 2 outputs a scan instruction signal (STB) in step 1, in step 2 it is determined whether or not the finger touches the panel. When it is determined that the finger has touched the touch panel, in step 3 the coordinates of that position are read. In step 4, the content of the touch memory 10, which stores the touch condition of the preceding scan, is read to determine whether or not the finger touches the panel for the first time. When it is determined that the content of the touch memory 10 has been cleared, then in step 5 "1" is written in the touch memory, in step 6 the above-described coordinates of the position are stored in the coordinate memory 6 and step 7 the timer is reset and started.

(1) Discrimination of the Finger Operations U, D, R and L

Discrimination of the finger operations U, D, R and L are achieved in Steps 8 through 17.

In step 8, the coordinates stored in the coordinate memory 6 are compared with the present coordinates to obtain the variations in the X- and Y-directions. In step 9, by referring to the command memory 11 which stores the operation content outputted previously, it is determined whether or not the upward, downward, rightward or leftward operation has been applied to the command discriminator 12. If it is determined that the command has been applied thereto, then it is unnecessary to discriminate the movement in that direction again, and steps 11 are effected in which, when the finger is moved eight coordinates or more, the movement in a direction perpendicular to the direction of that movement is detected so that the finger movement may not be regarded as "the finger is moved four coordinates twice". If no command is applied to the command discriminator 12, then in step 10 it is determined from the above-described variations whether the finger is moved horizontally or vertically.

In step 12, it is determined whether, in each of the X— and Y-directions, the finger is moved in the positive (+) direction or in the negative (—) direction, so that in step 13 the operation content corresponding to the direction of movement is provided.

In step 14, the operation content thus provided is applied to the command discriminator 12 (in this operation, the command discriminator 12 supplies the instruction to the system controller 13 which has been predetermined for the electronic equipment in use), and in step 15 the operation content is stored in the command memory 11.

In step 16, the coordinates stored in the coordinate memory are rewritten into those of the touch position obtained at the time of outputting the operation content. And in step 17, the timer is reset so that the following discrimination is carried out.

(2) Discrimination of the Finger Operation KEEP

The finger operations KEEP and HIT are distinguished from each other according to how long the finger touches the touch panel. Therefore, if the finger operation KEEP is determined merely from the time count data of the timer 7, then the determination may include the finger operation HIT. That is, in the following case:

0 to 0.5 second ---------- HIT
0.5 to 1 second ---------- Not applicable
More than 1 second ------- KEEP while the finger operation KEEP is discriminated, the finger operation HIT may occur. In the case where the touch time is 0.5 to 1 second, no action is taken, as was listed above. This is to prevent an erroneous operation which may be caused when the finger operations are not strictly defined. Therefore, the step may be eliminated as the case may be.

Figure 7:
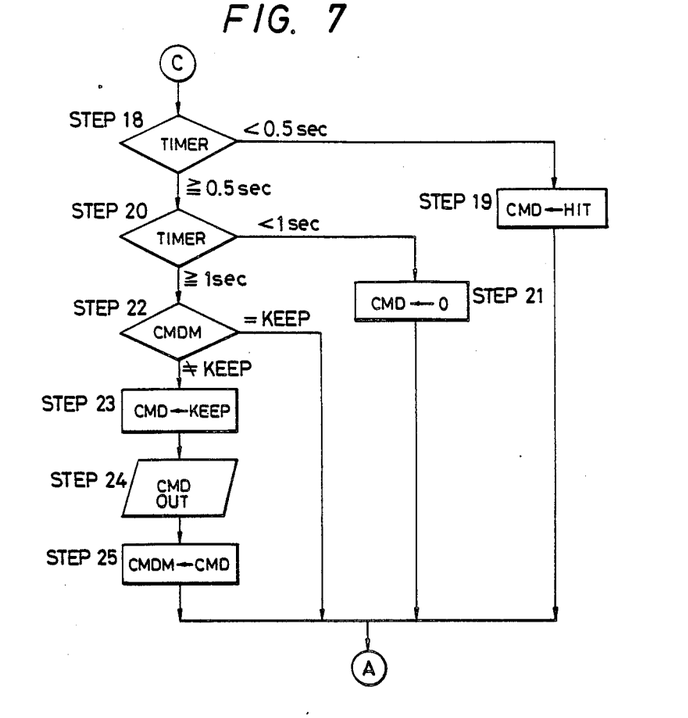

Therefore, in a routine consisting of steps 18 through 25 as shown in FIG. 7, when in step 20 the time count data of the timer exceeds one (1) second and in step 22 it is determined that the finger operation KEEP has not been supplied, as the operation content, to the command discriminator 12, then it is supplied, as the operation content, to the command discriminator 12 in step 24. The reason why, in step 22, it is detected whether or not the finger operation KEEP has been supplied as the operation content is to prevent the difficulty that, when the finger touches the touch panel for more than two seconds, the finger operation KEEP may be provided as the operation content two or more times.

When in step 18 the touch time is shorter than 0.5 second, in step 19 the finger operation HIT is provided as the operation content; however, it is not applied to the command discriminator 12 yet in the flow chart.

(3) Discrimination of the Finger Operations HIT and 2HIT

Figure 8:
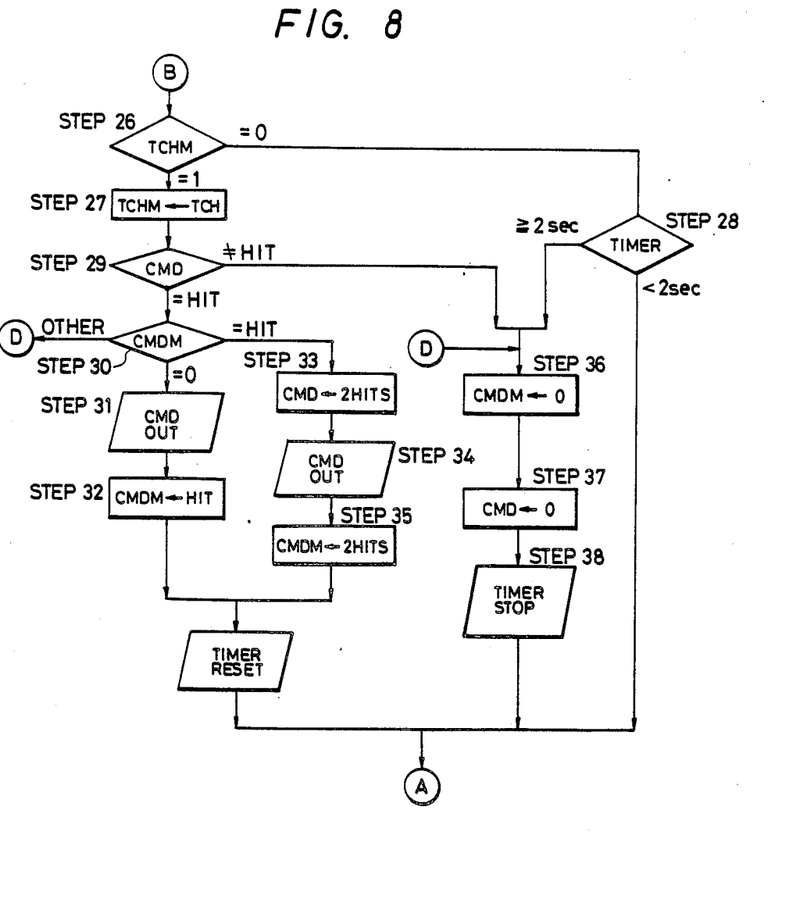

The finger operations HIT and 2HIT can be identified as shown in a flow chart of FIG. 8.

Figure 6:
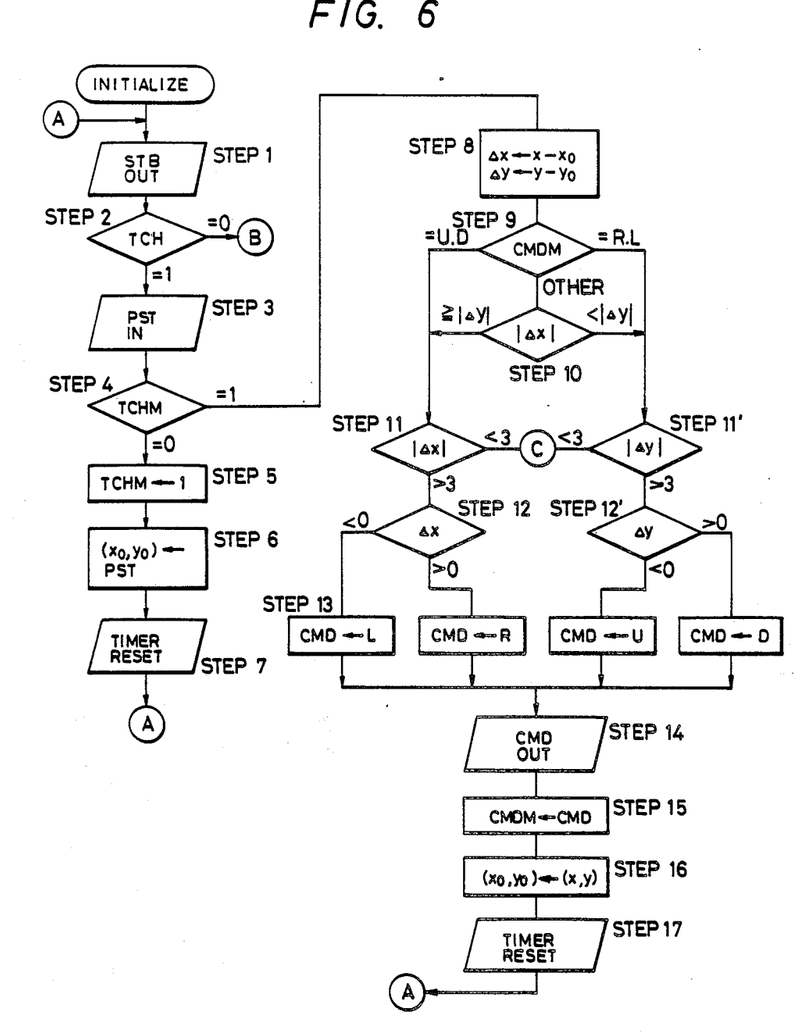
FIGS. 6, 7, and 8 are three parts of a flow chart for describing the operation of the touch panel control device of the invention.

When in step 2 of FIG. 6 it is determined that the finger is not in touch with the touch panel, then in step 26 it can be determined by referring to the touch memory 10 adapted to store the touch or non-touch detected in the preceding scan whether or not the touch was just now released. When it is determined that the touch was released just now, then the content of the touch memory 11 is "1". In step 27 the content of the touch memory 11 is cleared, and in step 29 it is determined whether or not the operation content is of the finger operation HIT. That is, if in step 19 of FIG. 7 the finger operation HIT is provided as the operation content, then step 30 is effected. In step 30, when it is determined from the content of the command memory 11 that nothing is provided, then the operation content, or HIT, is applied to the command discriminator 12. If the finger operation HIT is stored as the operation content in the command memory 11, then it is the second finger operation HIT, and therefore the finger operation 2 HIT is applied as the operation content to the command discriminator 12. If the storage data of the command memory 11 is other than that, then in a routine of steps 36 through 38 the command memory and the operation content are cleared, and the timer is stopped.

When in step 26 it is determined that the content of the touch memory 10 has been cleared since the preceding scan, then step 28 is effected. If, in step 28, the timer shows the lapse of two seconds; i.e., nothing is operated for two seconds, then the routine of steps 36, 37, and 38 is effected.

The operation discriminator 2 can apply the seven operating modes to the command discriminator 12 in the above-described manner.

In the operation discriminator 2, the above-described operation contents are converted into commands suitable for the operations of the acoustic devices to be controlled in such a manner that any one of the commands can be used for a plurality of acoustic devices— for instance the finger operation R is used for the "up direction sweep" of a tuner and also for the "fast forward" of a tape deck. The commands are applied to the system controller 13. In response to the commands are applied to the system controller 13. In response to the commands, the system controller 13 controls the operations of the acoustic devices.

In the above-described embodiment, the seven finger operations are discriminated, and in response to the seven finger operations thus discriminated the command discriminator outputs the commands. If the seven finger operations are utilized in combination, then more commands can be issued.

For instance, in the case of a tape deck, the finger operations may be combined as follows: When, after the "fast forward" operation is selected by the finger operation R, the finger operation U is carried out, a so-called "FF SCAN" operation can be performed in which the "fast forward" operation of the tape is carried out to detect an intermusic region, and after the sound reproduction is performed, the "fast forward" operation is carried out again. And when the finger operation R is followed by the finger operation D, the "FF music search" operation is carried out.

In this case, the system controller 13 applied data representing the operating condition of the acoustic device to the command discriminator 12 at all times, and the command provided by the command discriminator is determined according to the operating condition.

In the case of the tape deck described above, normally the finger operation R is used for the command "fast forward", and the finger operation U is for the command "volume up". However, during the "fast forward" operation, the finger operation U is used to output the command "FF scan".

If a plurality of operation contents are combined to provide a command in the above-described manner, then the finger operations can be applied to a variety of operation modes of acoustic devices mounted in a vehicle.

The touch panel 1 may comprise a picture display unit such as a cathode ray tube (CRT). The system controller 13 applies display mode data to a CRT driver 14 in correspondence to an acoustic device in use, to thereby control the display on the touch panel 1.

Figure 9A:
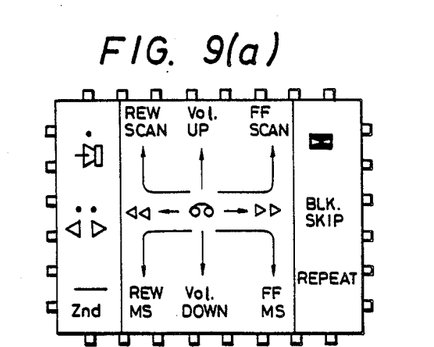
FIGS. 9(a) and 9(b) are illustrations of displays on the touch panel.
Figure 9B:
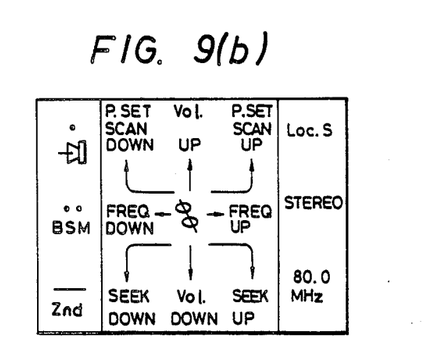

FIGS. 9(a) and 9(b) show examples of a CRT display, more specifically, the part (a) of FIG. 9 shows a CRT display in the "tape deck" mode, and the part (b) of FIG. 9 shows a CRT display in a "tuner" mode.

In FIG. 9, the finger operations U, D, R and L are indicated by the arrows which are extended upwardly, downwardly, rightwardly and leftwardly, respectively: and finger operations HIT, 2HIT and KEEP are indicated by one dot, two dots and a bar, respectively; and the compound finger operations are indicated by the bent arrows—for instance the compound finger operation R U is indicated by the arrow which is extended rightwardly and then upwardly.

Therefore, merely by moving the finger according to the indications or marks displayed on the touch panel, the commands corresponding to the finger operations can be applied to the system controller 13.

The contents of the display on the display unit can be changed according to the operating conditions of an acoustic device to be controlled. For instance, for the "fast forward" operation of a tape deck, the mark 'Ե 곧 is caused to flicker or its color is changed, to that the operator can detect whether or not the finger operation on the touch panel has been carried out correctly, to thereby prevent erroneous operation.

As shown in FIG. 9 the display mark "2nd" is provided for the finger operation KEEP. It can be utilized in the case where the number of finger operations is smaller than the number of commands to be issued. That is, in this case, the first picture display is switched over to the second picture display by one finger operation (KEEP in this case) so that the command discriminator 12 can provide commands different from those used when the first picture display is employed. That is, more intricate operations of electronic devices can be controlled.

As is apparent from the above description, the predetermined commands can be issued according to the distance of movement of the finger over the touch panel, the period of time for which the finger touches the touch panel, and the number of times the touch panel is touched with the finger, and one and the same touch panel can be used for a plurality of acoustic devices such as a cassette tape player and a radio tuner installed in a vehicle. Therefore, the limited space in the vehicle can be efficiently utilized, and the touch panel control device installed will never obstruct the operator's driving. Furthermore, since the touch panel serves as the display unit, the probability of erroneous operation is decreased.

What is claimed is:

1. A touch panel control device for outputting control data to select an operation mode for an electronic device according to how a finger touches a touch panel, comprising:

touch position detecting means arranged in a matrix form on said touch panel, for detecting the coordinates of a touch position of said touch panel;

scanning means for periodically scanning said touch position detecting means;

memory means responsive to said touch position detecting means for storing the coordinates of a detected touch position on said touch panel;

coordinate comparing means for comparing, for each scan, said coordinates stored in said memory means with those of a current touch position while a finger touches said panel to determine the direction of finger movement;

timer means for performing a time measuring operation initiated when a finger first touches a touch position on said touch panel as detected by said touch position detecting means and continuing so long as the finger continues to touch said touch position; and an operation discriminator for selectively outputting said control data to select an operation mode from a plurality of possible operation modes dependent upon the time measuring operation of said timer means and the results of comparisons of said coordinate comparing means, whereby said operation modes are discriminated based upon the direction of finger movement when the finger moves across the touch panel for more than a predetermined distance, and whereby said operation modes are discriminated based upon the time duration a finger touches said touch panel when the finger moves across said touch panel for less than said predetermined distance.

2. A touch panel control device as claimed in claim 1, wherein said touch position detecting means comprises light emitting elements and light receiving elements arranged along the sides of said touch panel in such a manner that said light receiving elements receive light beams emitted by respective said light emitting elements.

3. A touch panel control device as claimed in claim 1, in which said touch panel includes a picture display unit, the display content of which is changeable according to an electronic device to be controlled and operating conditions thereof.

* * * * *